(12) United States Patent
Nasman et al.

(10) Patent No.: US 11,466,778 B2
(45) Date of Patent: *Oct. 11, 2022

(54) ROTATIONAL EQUIPMENT SEAL ELEMENT WITH INTERNAL FLUID PASSAGE

(71) Applicant: Raytheon Technologies Corporation, Farmington, CT (US)

(72) Inventors: Benjamin Nasman, Tolland, CT (US); Michael M. Davis, North Granby, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 155 days.

This patent is subject to a terminal disclaimer.

(21) Appl. No.: 16/859,374

(22) Filed: Apr. 27, 2020

(65) Prior Publication Data

US 2021/0332888 A1 Oct. 28, 2021

(51) Int. Cl.
   *F16J 15/16* (2006.01)
   *F01D 11/00* (2006.01)

(52) U.S. Cl.
   CPC .......... *F16J 15/162* (2013.01); *F01D 11/006* (2013.01); *F05D 2220/32* (2013.01); *F05D 2240/50* (2013.01); *F05D 2240/55* (2013.01)

(58) Field of Classification Search
   CPC .... F16J 15/00; F16J 15/16; F16J 15/50; F16J 15/52; F16J 15/162; F01D 11/00; F01D 11/005; F01D 11/006; F01D 11/008; F05D 2220/00; F05D 2220/32; F05D 2220/321; F05D 2220/3212–3213; F05D 2220/3215–3219; F05D 2240/00; F05D 2240/50; F05D 2240/55

USPC ........................................................ 277/411
See application file for complete search history.

(56) References Cited

U.S. PATENT DOCUMENTS

| | | | | | |
|---|---|---|---|---|---|
| 3,147,013 | A | * | 9/1964 | Tracy | F04D 29/126 277/400 |
| 3,572,727 | A | * | 3/1971 | Greiner | F16J 15/342 277/388 |
| 3,698,725 | A | * | 10/1972 | Klabunde | B23Q 11/0875 384/121 |
| 3,964,753 | A | * | 6/1976 | Junker | F16J 15/30 277/350 |
| 4,406,459 | A | * | 9/1983 | Davis | F16J 15/3404 277/401 |

(Continued)

FOREIGN PATENT DOCUMENTS

CN    108644019 A    10/2018

OTHER PUBLICATIONS

Search report for EP21170799.7 dated Sep. 24, 2021.

*Primary Examiner* — Nathan Cumar
(74) *Attorney, Agent, or Firm* — Getz Balich LLC (57) ABSTRACT

An assembly is provided for rotational equipment. This assembly includes a seal land and a seal element. The seal land extends circumferentially around and is rotatable about an axial centerline. The seal land includes a seal land surface. The seal element extends circumferentially around the axial centerline. The seal element includes a seal element surface and a seal element passage. The seal element surface is abutted against and is sealingly engaged with the seal land surface. The seal element passage extends through the seal element to an interface between the seal element surface and the seal land surface.

17 Claims, 11 Drawing Sheets

(56) References Cited

U.S. PATENT DOCUMENTS

| | | | | |
|---|---|---|---|---|
| 4,523,764 | A | 6/1985 | Albers | |
| 4,905,637 | A * | 3/1990 | Ott | F01B 3/0026 123/196 R |
| 5,658,127 | A * | 8/1997 | Bond | F01D 25/183 277/399 |
| 5,813,674 | A * | 9/1998 | Dickie | F16J 15/38 277/390 |
| 6,655,693 | B2 * | 12/2003 | Hosanna | F16J 15/3404 277/358 |
| 6,758,598 | B2 * | 7/2004 | Beauvais | F01D 25/162 184/5 |
| 7,265,467 | B2 * | 9/2007 | Sumi | F16C 17/107 310/90 |
| 7,410,341 | B2 * | 8/2008 | Gockel | F01D 25/125 415/110 |
| 7,998,238 | B2 * | 8/2011 | Takayama | B22F 7/008 75/246 |
| 8,109,716 | B2 * | 2/2012 | Glahn | F01D 11/04 415/168.2 |
| 8,845,282 | B2 * | 9/2014 | LaPierre | F01D 25/183 415/170.1 |
| 8,920,034 | B2 * | 12/2014 | Galivel | F02C 7/06 384/130 |
| 8,944,691 | B2 * | 2/2015 | Chumokhvalov | F16C 33/6659 384/473 |
| 10,288,163 | B2 | 5/2019 | Miller | |
| 10,344,679 | B2 | 7/2019 | Denman | |
| 10,626,743 | B2 | 4/2020 | Bidkar | |
| 11,187,093 | B2 | 11/2021 | Trivedi | |
| 2004/0154578 | A1 * | 8/2004 | Weaver | F01M 11/02 123/197.3 |
| 2016/0032840 | A1 * | 2/2016 | James | F01D 11/003 415/170.1 |

\* cited by examiner

ROTATIONAL EQUIPMENT SEAL ELEMENT WITH INTERNAL FLUID PASSAGE

BACKGROUND OF THE DISCLOSURE

1. Technical Field

This disclosure relates generally to rotational equipment and, more particularly, to fluid delivery to a rotational equipment component.

2. Background Information

A typical gas turbine engine includes seal assemblies to seal gaps between stationary and rotating components. One such known seal assembly includes a stationary carbon seal element that contacts a rotating seal land. Rubbing friction between the stationary carbon seal element and the rotating seal land subjects both the stationary carbon seal element and the rotating seal land to relatively high temperatures and, thus, thermal stresses and fatigue. Various techniques are known in the art for cooling such a seal assembly. While these known cooling techniques have various advantages, there is still room in the art for improvement.

SUMMARY OF THE DISCLOSURE

According to an aspect of the present disclosure, an assembly is provided for rotational equipment. This assembly includes a seal land and a seal element. The seal land extends circumferentially around and is rotatable about an axial centerline. The seal land includes a seal land surface. The seal element extends circumferentially around the axial centerline. The seal element includes a seal element surface and a seal element passage. The seal element surface is abutted against and is sealingly engaged with the seal land surface. The seal element passage extends through the seal element to an interface between the seal element surface and the seal land surface.

According to another aspect of the present disclosure, another assembly is provided for rotational equipment. This assembly includes a guide rail, a seal carrier and a seal element. The seal carrier is configured to translate along the guide rail. The seal carrier includes a base and a flange projecting out from the base. The flange includes an aperture through which the guide rail projects. The seal element is mounted to the base. The seal element includes a seal element surface and an internal seal element passage that extends through the seal element to the seal element surface.

According to still another aspect of the present disclosure, another assembly is provided for rotational equipment. This assembly includes a guide rail, a seal carrier and a seal element. The guide rail includes a guide rail passage. The seal carrier is mated with and is translatable along the guide rail. The seal element is mounted to the seal carrier. The seal element includes a seal element surface and a seal element passage that extends through the seal element to the seal element surface. The seal element passage is fluidly coupled with the guide rail passage.

The assembly may also include a seal land that includes a seal land surface. The internal seal element passage may extend to an interface between the seal element surface and the seal land surface.

The seal element may also include a second seal element passage. The second seal element passage may extend through the seal element to the interface between the seal element surface and the seal land surface.

The seal element may be configured as or otherwise include an annular carbon seal element.

The seal element may extend axially along the axial centerline between a seal element first end and a second element second end. The seal element surface may be arranged at the seal element first end.

The seal element passage may extend axially within the seal element to an outlet in the seal element surface.

The seal land may also include a groove and an aperture. The groove may be arranged in the seal land surface radially displaced from the outlet. The aperture may be fluidly coupled with the groove and may extend through the seal land.

The seal element passage may extend within the seal element to an outlet in the seal element surface. The seal land surface may overlap the outlet.

The assembly may also include static structure of a gas turbine engine and a rotating structure of the gas turbine engine. The seal element may be non-rotatably coupled to the static structure. The seal land may be rotatable with the rotating structure. The rotational equipment may be configured as or otherwise include the gas turbine engine.

The assembly may also include a guide rail and a seal carrier. The seal carrier may be mated with and translatable along the guide rail. The seal element may be mounted to the seal carrier.

The assembly may also include a guide rail and a seal support structure. The guide rail may be configured with a guide rail passage. The seal support structure may be mated with and may be translatable along the guide rail. The seal element may be mounted to the seal support structure. The seal element passage may be fluidly coupled with the guide rail passage through the seal support structure.

The assembly may also include a spring element engaged with the seal support structure and configured to bias the seal element against the seal land.

The assembly may also include a plurality of guide rails that include the guide rail. The guide rails may be arranged in an array about the axial centerline. The seal support structure may be mated with and slidable along each of the guide rails.

The seal support structure may include a seal carrier and a fluid coupling device. The seal carrier may be mated with and slidable along the guide rail. The seal carrier may be configured with a carrier passage that is fluidly coupled with the seal element passage. The fluid coupling device may be mounted to and translatable along the guide rail. The fluid coupling device may be configured with a coupling device passage that fluidly couples the guide rail passage with the carrier passage.

The fluid coupling device may be configured to move relative to the seal carrier.

The fluid coupling device may include a sleeve and a tube. The sleeve may be mounted to and translatable along the guide rail. The tube may project out from the sleeve and into a receptacle of the seal carrier.

The carrier passage may include an annular slot that interfaces with an inlet of the seal element passage.

The seal carrier may include a flange. The guide rail may project through a channel that extends radially into the flange.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
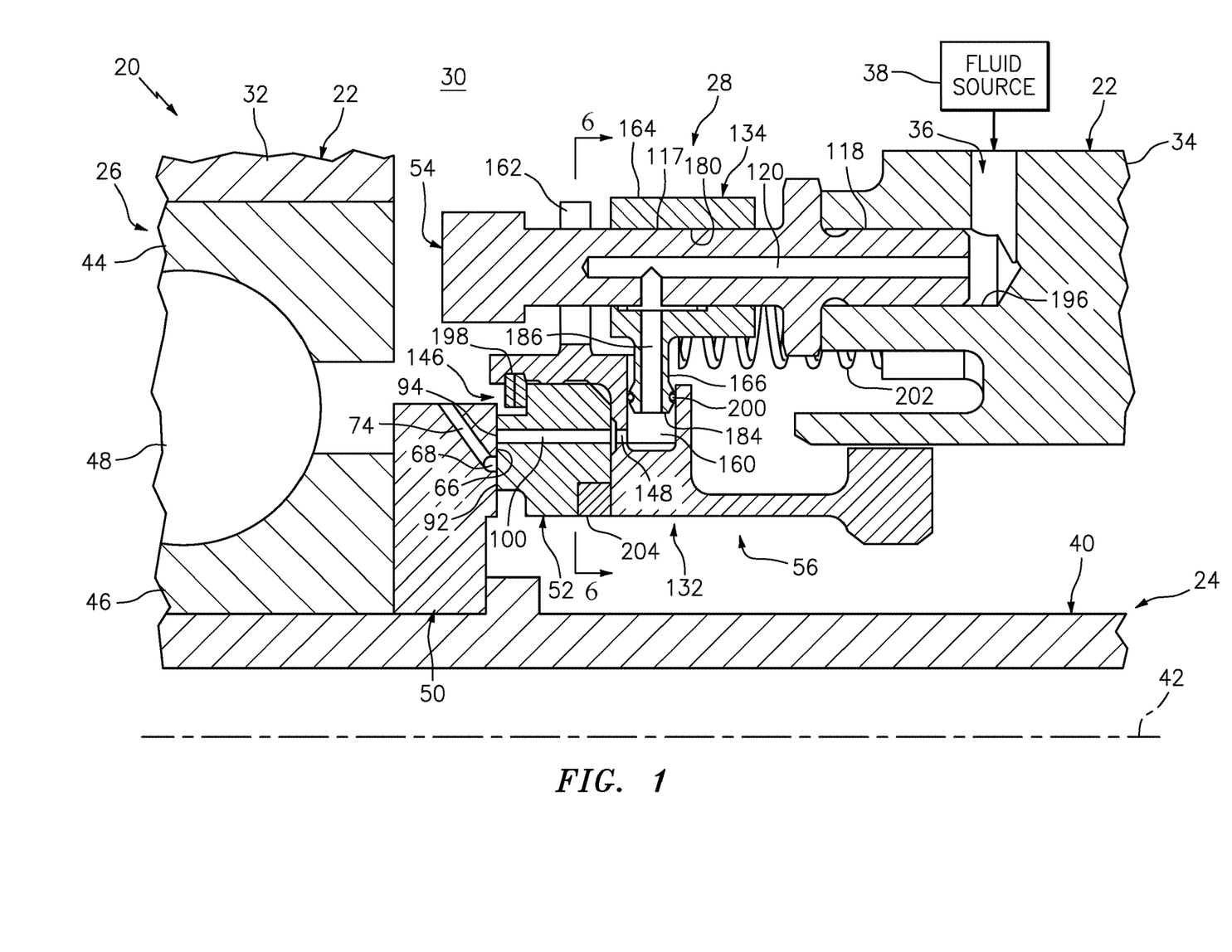
FIG. 1 is a partial side sectional illustration of an assembly for rotational equipment such as a gas turbine engine.

FIG. 1 is a partial side sectional illustration of an assembly 20 for a piece of rotational equipment. The rotational equipment may be configured as a gas turbine engine for an aircraft propulsion system such as, but not limited to, a geared or direct-drive turbofan gas turbine engine. However, the assembly 20 of the present disclosure is not limited to such an aircraft application nor a gas turbine engine application. The assembly 20, for example, may alternatively be configured with rotational equipment such as an industrial gas turbine engine, a wind turbine, a water turbine or any other apparatus which includes a seal assembly for sealing a gap between a rotating component and a static component.

The assembly 20 of FIG. 1 includes a static structure 22, a rotating assembly 24 and at least one bearing 26 for rotatably supporting the rotating assembly 24 relative to the static structure 22. The assembly 20 of FIG. 1 also includes a seal assembly 28 configured to seal an annular gap between the rotating assembly 24 and the static structure 22.

The static structure 22 is configured as a stationary part of the rotational equipment. The static structure 22 of FIG. 1, for example, is configured to at least partially form an internal bearing compartment 30 for housing at least the bearing 26. This static structure 22 includes a bearing support 32 such as, but not limited to, a strut. The static structure 22 also includes a seal assembly support 34; e.g., an annular wall. The seal assembly support 34 of FIG. 1 is configured with an internal static structure (e.g., fluid) passage 36 which extends within the static structure 22 and, more particularly, the seal assembly support 34. The static structure passage 36 is configured to receive fluid (e.g., lubricant, coolant, etc.) from a fluid source 38 such as, but not limited to, a reservoir (e.g., a tank or sump), pump, etc.

The rotating assembly 24 of FIG. 1 includes at least a rotating structure 40. The rotating assembly 24 and its rotating structure 40 are each configured to rotate about an axial centerline 42, which centerline 42 may be an axial centerline and/or a central rotational axis of the rotational equipment. The rotating structure 40 of FIG. 1 is configured as a tubular shaft. However, in other embodiments, the rotating structure 40 may be configured as another component (e.g., a sleeve) mounted to and rotatable with a shaft of the rotational equipment, or any other rotor within the rotational equipment. The rotating structure 40 of FIG. 1 extends axially along the axial centerline 42 through (or partially into or within) the static structure 22. The static structure 22 of FIG. 1 thereby extends circumferentially about (e.g., completely around) the axial centerline 42 and the rotating assembly 24 and its rotating structure 40.

The bearing 26 may be configured as a roller element bearing. The bearing 26 of FIG. 1, for example, includes an annular outer race 44, an annular inner race 46 and a plurality of bearing elements 48; e.g., cylindrical or spherical elements. The outer race 44 circumscribes the inner race 46 and the bearing elements 48. The outer race 44 is mounted to the static structure 22 and, more particularly, the bearing support 32. The inner race 46 circumscribes and is mounted to the rotating structure 40. The bearing elements 48 are arranged in an annular array about the axial centerline 42, which array is radially between and engaged with the outer race 44 and the inner race 46. The present disclosure, however, is not limited to the foregoing exemplary bearing configuration. For example, in other embodiments, the bearing 26 may alternatively be configured as a journal bearing or any other type of bearing utilized in the rotational equipment.

The seal assembly 28 of FIG. 1 is configured to seal the gap which extends (e.g., radially and/or axially) between the static structure 22 and the rotating structure 40. Of course, in other embodiments, the seal assembly 28 may seal a gap extending between the static structure 22 and another rotating component mounted to and/or rotatable with the rotating structure 40.

The seal assembly 28 of FIG. 1 includes an annular seal land 50 and an annular seal element 52; e.g., a carbon seal element. The seal assembly 28 of FIG. 1 also includes one or more guide rails 54 and a seal support structure 56.

Figure 2:
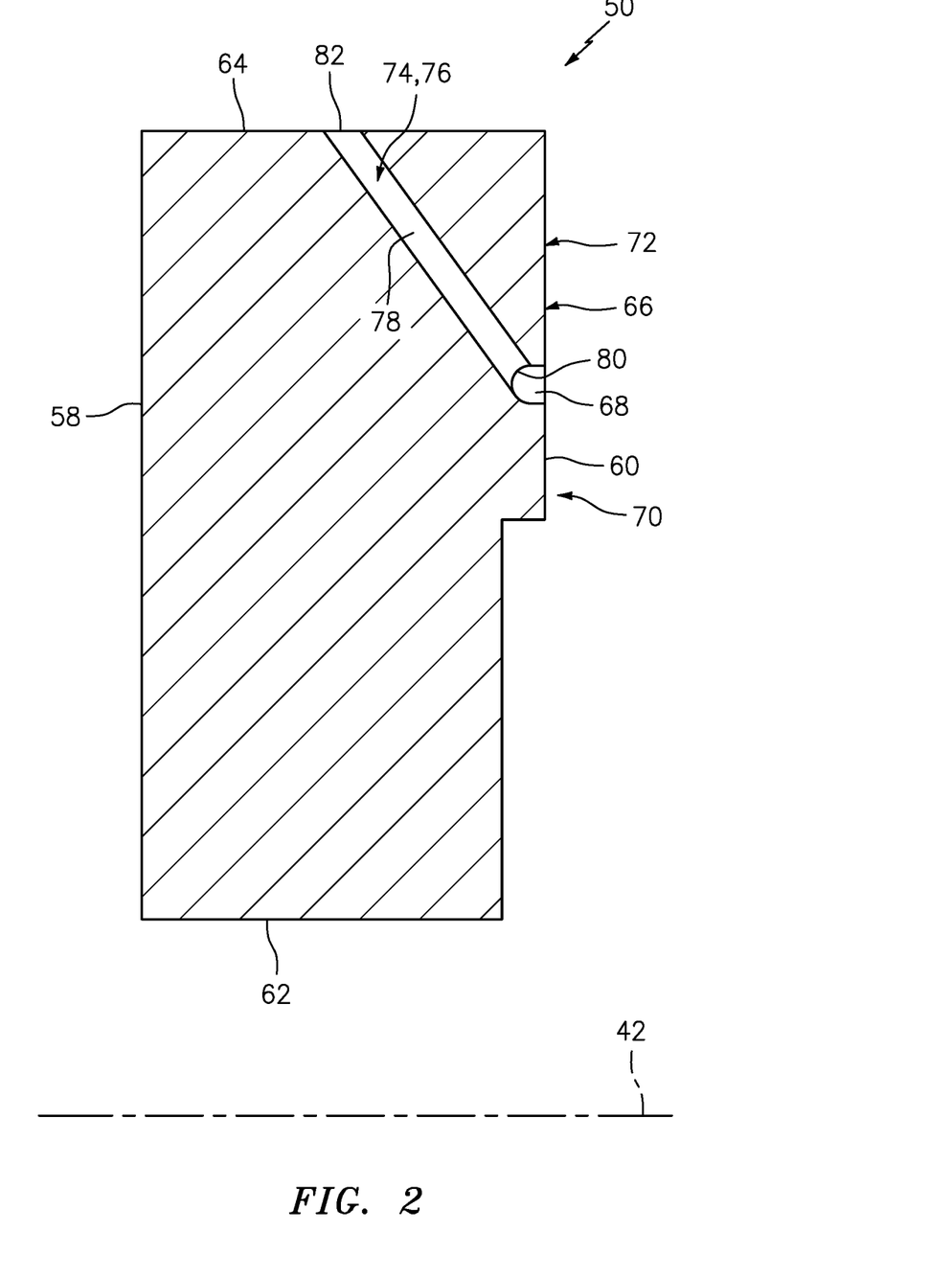
FIG. 2 is a partial side sectional illustration of a seal land.

Referring to FIG. 2, the seal land 50 extends circumferentially about (e.g., completely around) the axial centerline 42. The seal land 50 may thereby be configured with a full hoop body. The seal land 50 extends axially along the axial centerline 42 between a (e.g., axial) seal land first end 58 and a (e.g., axial) seal land second end 60. The seal land 50 extends radially between a (e.g., radial) seal land inner side 62 and a (e.g., radial) seal land outer side 64.

The seal land 50 includes an annular (e.g., radially extending) seal land surface 66 located at (e.g., on, adjacent or proximate) the seal land second end 60. This seal land surface 66 may be an interrupted surface. The seal land surface 66, for example, may be (e.g., circumferentially and/or radially) interrupted by one or more channels, slots, apertures and/or other types of surface interruptions. The seal land surface 66 of FIG. 2, in particular, is radially interrupted by a (e.g., annular) seal land passage groove 68. Portions 70 and 72 of the seal land surface 66 below and/or above the seal land groove 68, however, may be substantially uninterrupted. Each seal land surface portion 70, 72, for example, may be a (e.g., annular) flat planar surface portion configured without (e.g., circumferential and/or radial) interruptions such as, but not limited to, channels, slots and apertures. Of course, in other embodiments, one or each of these portions 70, 72 may also be interrupted. In still other embodiments, an entirety of the seal land surface 66 may be uninterrupted.

The seal land 50 of FIG. 2 is configured with an internal seal land (e.g., fluid) passage 74. This seal land passage 74 includes/is formed by one or more passageways 76 through the seal land 50; see also FIG. 3. Each passageway 76 includes/is formed by a respective portion of the seal land groove 68 and a respective seal land aperture 78 (e.g., a hole).

The seal land groove 68 is located at the seal land second end 60 and extends axially into the seal land 50 from the seal land surface 66 to a groove end. The seal land groove 68 extends radially within the seal land 50 between opposing groove inner and outer sides. The seal land groove 68 extends within the seal land 50 circumferentially about (e.g., completely around) the axial centerline 42.

Figure 3:
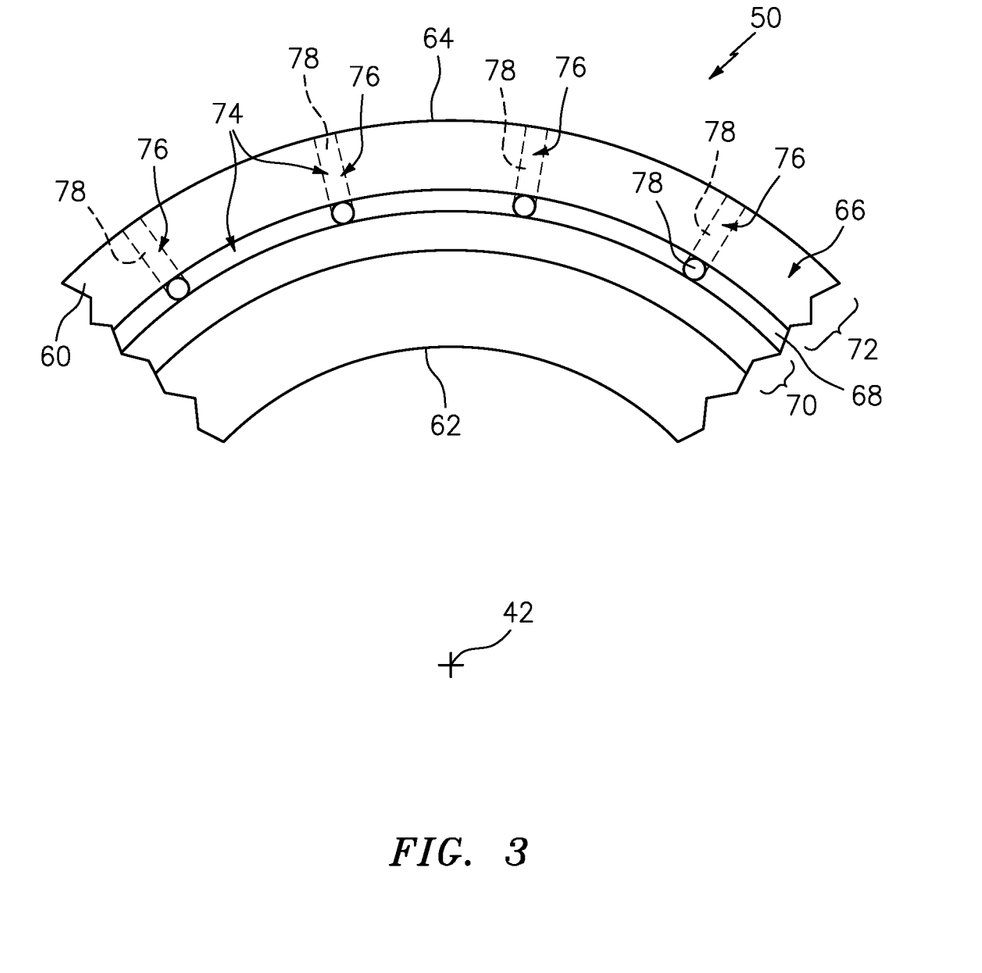
FIG. 3 is a partial end view of the seal land.

The seal land apertures 78 of FIG. 3 are arranged circumferentially about the axial centerline 42 in an annular array. Referring to FIG. 2, each seal land aperture 78 has a seal land aperture inlet 80 and a seal land passage outlet 82. The inlet 80 is fluidly coupled with the seal land groove 68. The outlet 82 is at the seal land outer side 64. Each seal land aperture 78 extends (e.g., radially and axially) through the seal land 50 from its inlet 80 to its outlet 82. Each seal land aperture 78 thereby projects out from the seal land groove 68, through the seal land 50, to the seal land outer side 64. The present disclosure, however, is not limited to such an exemplary seal land aperture arrangement.

Figure 4:
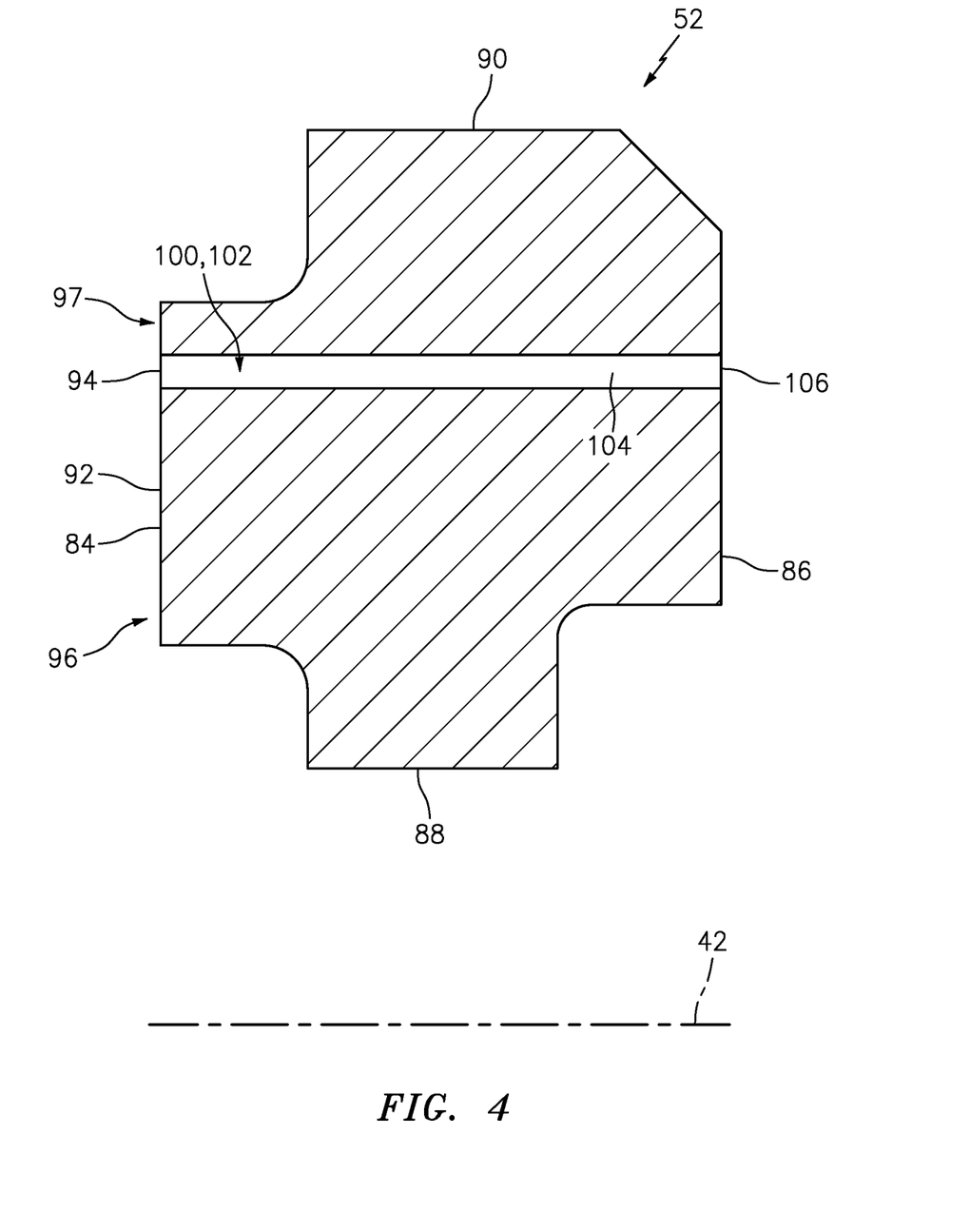
FIG. 4 is a partial side sectional illustration of a seal element.

Referring to FIG. 4, the seal element 52 extends circumferentially about (e.g., completely around) the axial centerline 42. The seal element 52 may thereby be configured with a full hoop body. This full hoop body may be a single unitary body; e.g., a monolithic body. Alternatively, the full hoop body may be a segmented body; e.g., the seal element 52 may be configured from an array of arcuate seal element segments. The seal element 52 extends axially along the axial centerline 42 between a (e.g., axial) seal element first end 84 and a (e.g., axial) seal element second end 86. The seal element 52 extends radially between a (e.g., radial) seal element inner side 88 and a (e.g., radial) seal element outer side 90.

Figure 5:
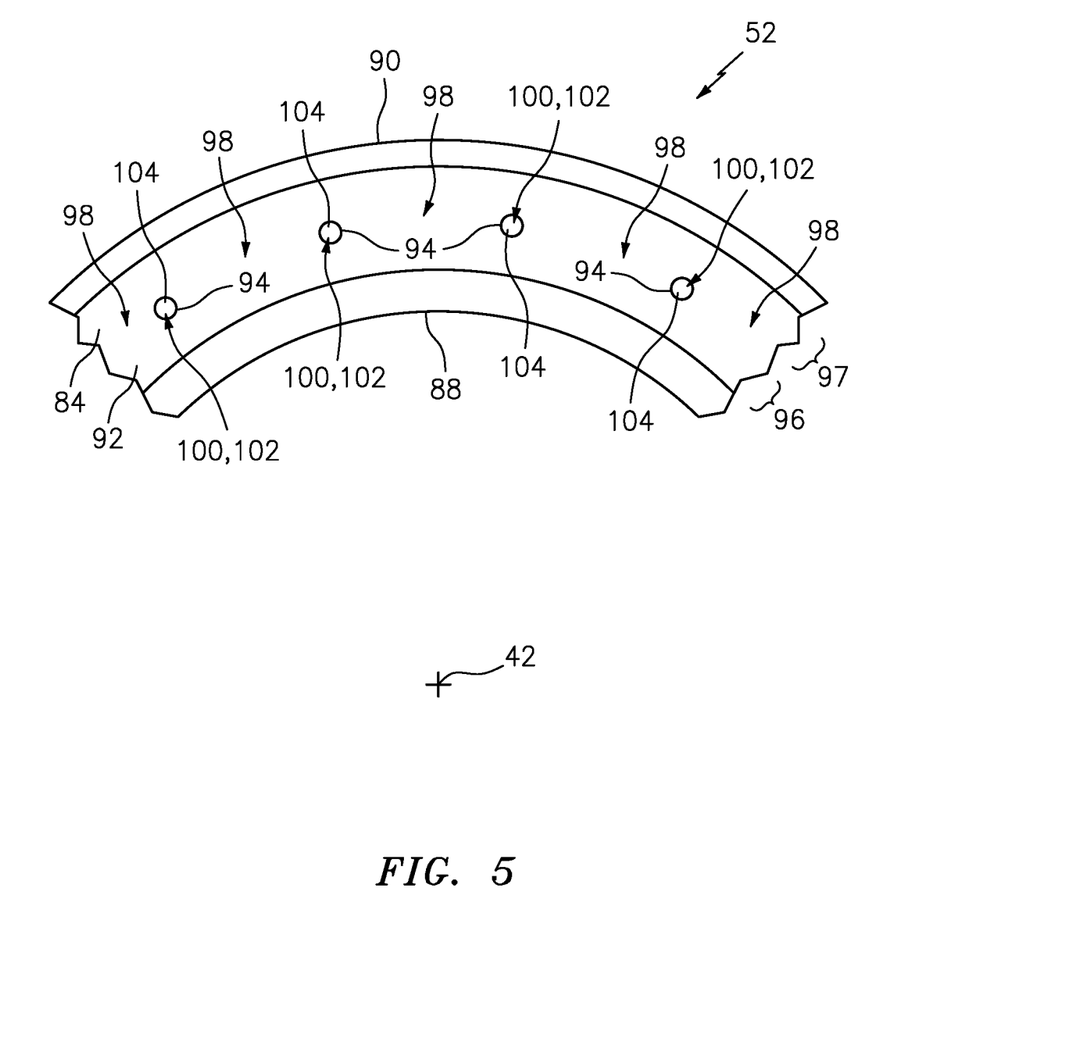
FIG. 5 is a partial end view illustration of the seal element.

The seal element 52 includes an annular (e.g., radially extending) seal element surface 92 located at (e.g., on, adjacent or proximate) the seal element first end 84. This seal element surface 92 is an interrupted surface. The seal element surface 92, for example, may be (e.g., circumferentially and/or radially) interrupted by one or more channels, slots, apertures and/or other types of surface interruptions. The seal element surface 92 of FIG. 4, in particular, is circumferentially and radially interrupted by one or more seal element passage outlets 94 (e.g., orifices). Referring to FIGS. 4 and 5, portions 96-98 of the seal element surface 92 below, above and/or in between the outlets 94, however, may be substantially uninterrupted. Each seal element surface portion 96-98, for example, may be a flat planar surface portion configured without (e.g., circumferential and/or radial) interruptions such as, but not limited to, channels, slots and apertures. Of course, in other embodiments, one or each of these portions 96-98 may also be interrupted.

The seal element 52 of FIGS. 4 and 5 is configured with an internal seal element (e.g., fluid) passage 100. This seal element passage 100 includes/is formed by one or more passageways 102 through the seal element 52. Each passageway 102 of FIG. 4 includes/is formed by (e.g., a single) seal element aperture 104 (e.g., a hole). Each seal element aperture 104 has a seal element passage inlet 106 and a respective one of the seal element passage outlets 94. The inlet 106 is at the seal element second end 86. The outlet 94 is at the seal element first end 84 in the seal element surface 92. Each seal element aperture 104 extends (e.g., axially) through the seal element 52 from its inlet 106 to its outlet 94. The present disclosure, however, is not limited to such an exemplary seal element aperture arrangement.

Figure 6:
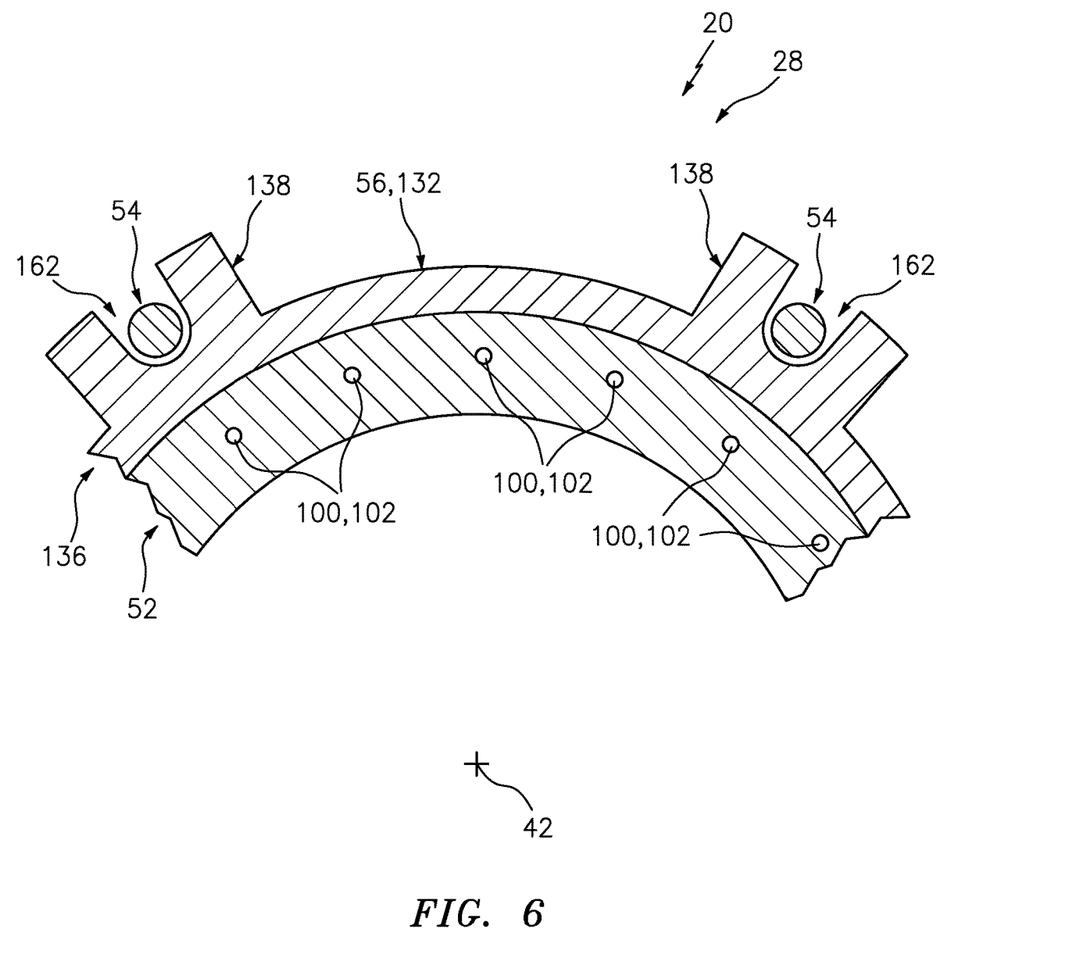
FIG. 6 is a cross-sectional illustration of a portion of the assembly of FIG. 1 along line 6-6.
Figure 7:
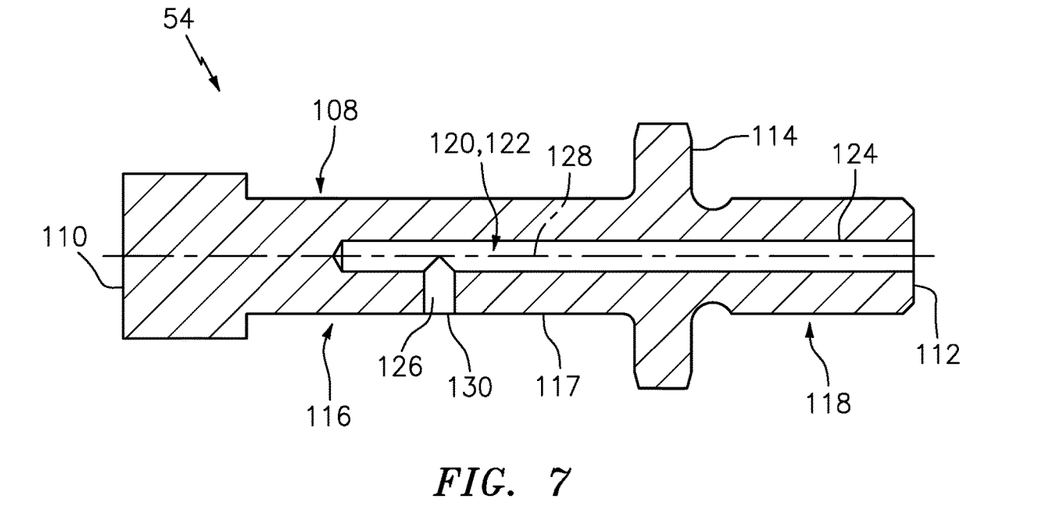
FIG. 7 is a side sectional illustration of a guide rail pin.

Referring to FIG. 6, the guide rails 54 are arranged circumferentially about the axial centerline 42 in an annular array. Referring to FIG. 7, each of the guide rails 54 may be configured as or otherwise include a guide pin. For example, each guide rail 54 of FIG. 7 may have, but is not limited to, a generally cylindrical body 108 that extends axially between a (e.g., axial) guide rail first end 110 and a (e.g., axial) guide rail second end 112. A generally annular flange 114 may project out from and circumscribes body 108. This flange 114 may be configured with a polygonal (e.g., hexagonal) peripheral cross-sectional geometry adapted for mating with an installation tool such as, but not limited to, a wrench or a socket. An axial first portion 116 of the body 108, axially between the guide rail first end 110 and the flange 114, may be configured with a smooth cylindrical surface 117. An axial second portion 118 of the body 108, axially between the guide rail second end 112 and the flange 114, may be configured with threads; e.g., the portion 118 is a threaded portion.

At least one of the guide rails 54 is configured with an internal guide rail (e.g., fluid) passage 120; e.g., a pin fluid passage. This guide rail passage 120 includes/is formed by a (e.g., single) passageway 122 through the guide rail 54. The passageway 122 includes/is formed by a guide rail bore 124 and a guide rail aperture 126 (e.g., a hole). The guide rail bore 124 extends longitudinally along a centerline 128 of the guide rail 54 partially into the guide rail 54 from the guide rail second end 112. The guide rail aperture 126 projects out from and is thereby fluidly coupled with the guide rail bore 124. The guide rail aperture 126 extends radially through a sidewall of the guide rail 54 to a guide rail passage outlet 130 in the cylindrical surface 117. Note, in some embodiments, the guide rail 54 may be configured with more than one guide rail aperture 126.

Referring to FIG. 1, the seal support structure 56 is configured to translate axially along the guide rails 54. The seal support structure 56 is also configured to support and provide fluid to the seal element 52. The seal support structure 56 of FIG. 1 includes a seal carrier 132 and at least one fluid coupling device 134 (e.g., a fluid delivery device).

Figure 8:
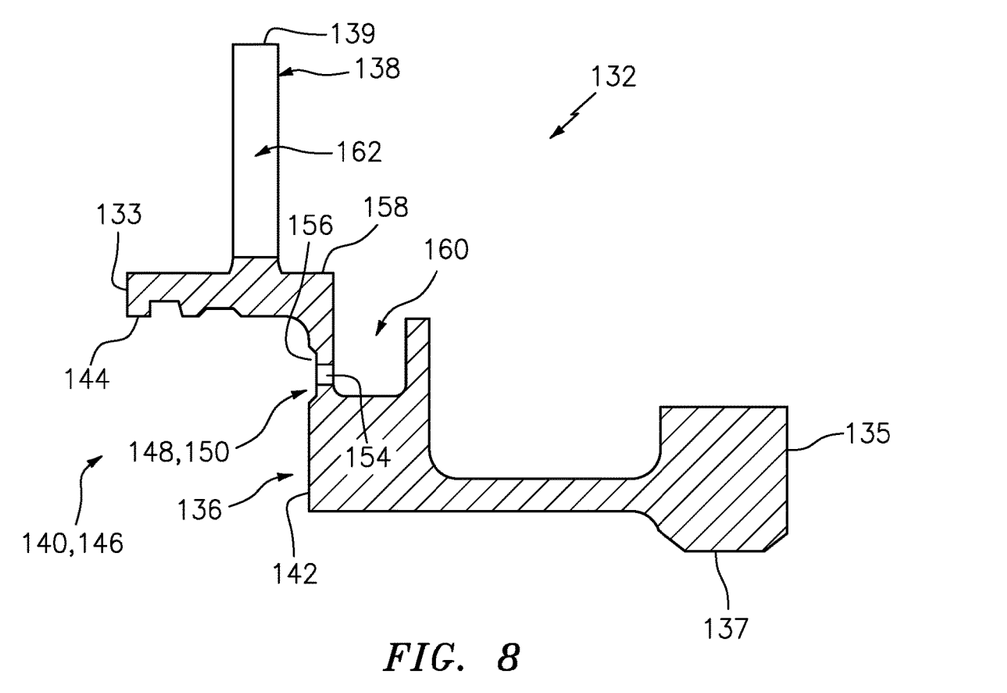
FIG. 8 is a partial side sectional illustration of a seal carrier.
Figure 9:
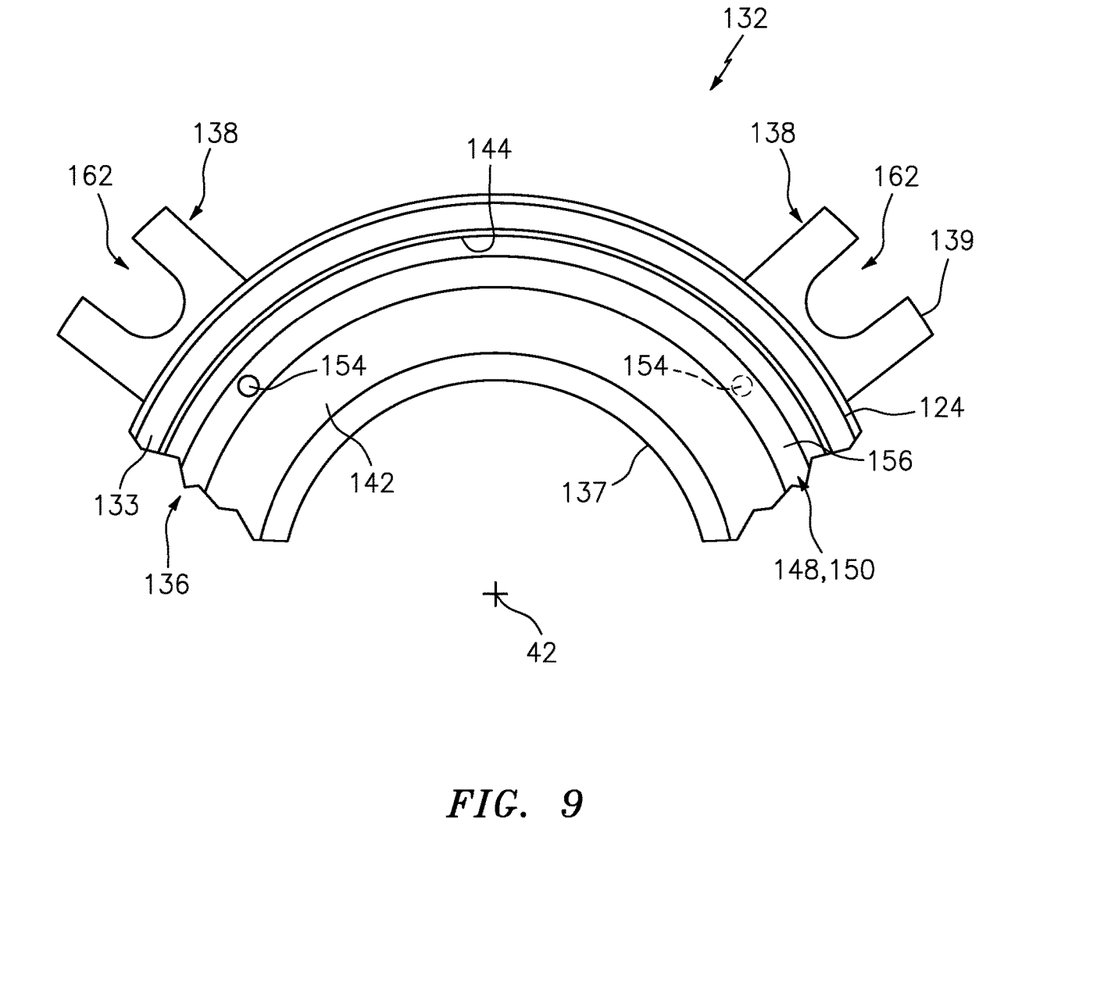
FIG. 9 is a partial end view illustration the seal carrier.

Referring to FIG. 8, the seal carrier 132 extends circumferentially about (e.g., completely around) the axial centerline 42; see also FIG. 9. The seal carrier 132 may thereby be configured with a full hoop body. The seal carrier 132 extends axially along the axial centerline 42 between a (e.g., axial) seal carrier first end 133 and a (e.g., axial) seal carrier second end 135. The seal carrier 132 extends radially between a (e.g., radial) seal carrier inner side 137 and a (e.g., radial) seal carrier outer side 139.

The seal carrier 132 of FIG. 8 includes a tubular seal carrier base 136 and one or more seal carrier flanges 138; see also FIGS. 6 and 9. The seal carrier base 136 is configured with an annular seal carrier recess/notch 140. This seal carrier recess 140 extends axially partially into the seal carrier base 136 from the seal carrier first end 133 to an (e.g., annular) axial end surface 142. The seal carrier recess 140 extends radially partially into the seal carrier base 136 from the seal carrier inner side 137 to a (e.g., tubular) radial end surface 144. The seal carrier recess 140 forms a seal carrier receptacle 146 for the seal element 52 as described below in further detail.

The seal carrier base 136 is configured with at least one seal carrier (e.g., fluid) passage 148. The seal carrier passage 148 includes/is formed by at least one passageway 150 through the seal carrier base 136. This passageway 150 includes/is formed by at least one seal carrier first aperture 152 (e.g., a hole), at least one seal carrier second aperture 154 (e.g., a hole) and a seal carrier slot 156. The first aperture 152 extends radially partially into the seal carrier base 136 from an outer surface 158 of the seal carrier base 136. This first aperture 152 is configured to form a seal carrier receptacle 160 for the fluid coupling device 134 as described below in further detail. The second aperture 154 extends axially within the seal carrier base 136 between the first aperture 152 and the seal carrier slot 156. The second aperture 154 thereby fluidly couples the first aperture 152 to the seal carrier slot 156. The seal carrier slot 156 is located in the axial end surface 142. This seal carrier slot 156 may be an annular slot (e.g., see FIG. 9), which extends circumferentially within the seal carrier base 136 around the centerline 42. The seal carrier slot 156 extends axially into the seal carrier 132 from the axial end surface 142 to a slot end. The seal carrier slot 156 extends radially within the seal carrier 132 between opposing inner and outer slot sides.

Referring to FIG. 9, the seal carrier flanges 138 are arranged circumferentially about the seal carrier base 136. Each seal carrier flange 138 includes a flange aperture 162 such as, but not limited to, a slot, channel, groove, etc.

Figure 10:
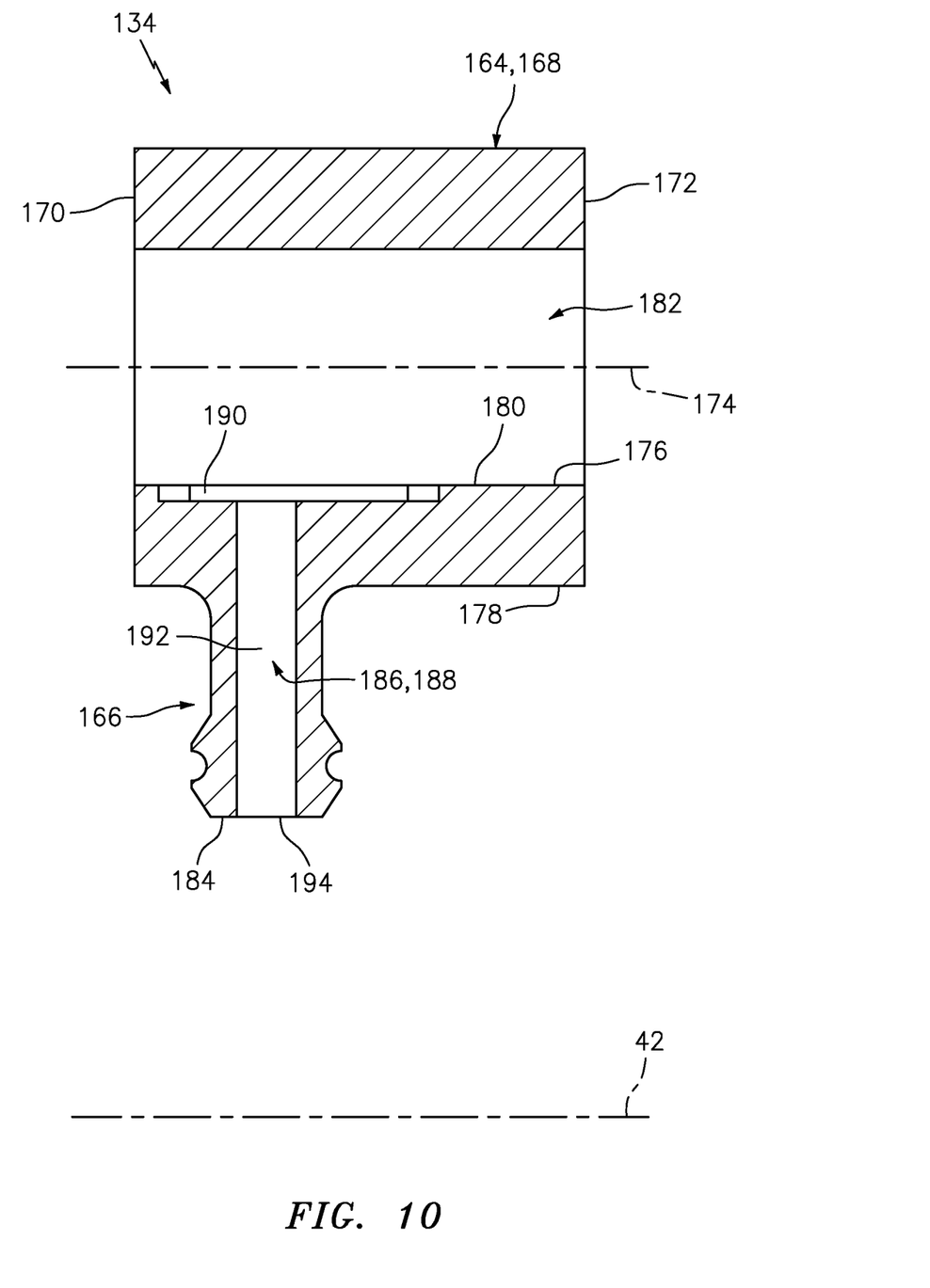
FIG. 10 is a side sectional illustration of a fluid coupling device.

Referring to FIG. 10, the fluid coupling device 134 includes a coupling device sleeve 164 (e.g., a linear hydrostatic bearing) and a coupling device tube 166 (e.g., a jumper tube). The coupling device sleeve 164 is configured as a tubular body 168. The tubular body 168 extends axially between a (e.g., axial) first end 170 of the fluid coupling device 134 and its sleeve 164 and a (e.g., axial) second end 172 of the fluid coupling device 134 and its sleeve 164. The tubular body 168 extends radially, relative to an axis 174 of the coupling device sleeve 164, between a (e.g., radial) sleeve inner side 176 and a (e.g., radial) sleeve outer side 178, where the axis 174 may be parallel to the axial centerline 42 and/or coaxial with the centerline 128 (see FIG. 7) when the fluid coupling device 134 is mated with the respective guide rail 54. A bore surface 180 (e.g., a cylindrical surface) of the coupling device sleeve 164 at the sleeve inner side 176 forms an internal sleeve bore 182. This sleeve bore 182 extends axially along the axis 174 through the fluid coupling device 134 and its sleeve 164 from the coupling device first end 170 to the coupling device second end 172.

The coupling device tube 166 may be configured as a tubular projection. The coupling device tube 166 projects radially, relative to the axis 174 of the coupling device sleeve 164, out from the sleeve outer side 178 to a distal end 184 of the coupling device tube 166.

The fluid coupling device 134 is configured with at least one coupling device (e.g., fluid) passage 186. This coupling device passage 186 includes/is formed by a (e.g., single) passageway 188 through the fluid coupling device 134. This passageway 188 includes/is formed by a coupling device slot 190 and a coupling device aperture 192 (e.g., a hole, a bore, etc.). The coupling device slot 190 is located in the coupling device sleeve 164 at its inner side 176. The coupling device slot 190 extends partially axially within the coupling device sleeve 164 and may extend either fully circumferentially or partially circumferentially about the axis 174 of the coupling device sleeve 164. The coupling device aperture 192 projects out from the coupling device slot 190 and extends through the coupling device sleeve 164 and the coupling device tube 166 to a coupling device passage outlet 194 at the tube distal end 184. In this embodiment, an outer portion of the coupling device aperture 192 forms a bore of the coupling device tube 166.

Referring to FIG. 1, the seal land 50 is arranged with the rotating structure 40 in such a manner so as to be rotatable with the rotating structure 40 about the axial centerline 42. The seal land 50 of FIG. 1, for example, circumscribes and is fixedly mounted to the rotating structure 40.

The guide rails 54 are fixedly mounted to the static structure 22. For example, the threaded portion 118 of each guide rail 54 may be screwed into a corresponding tapped hole 196 in the static structure 22. Each guide rail 54 is thereby connected to the static structure 22 by a threaded interface. However, in other embodiments, one, some or each guide rail 54 may alternatively be connected to the static structure 22 through staking, riveting, etc.

The seal element 52 is seated in the seal carrier receptacle 146. A split ring 198 and/or another device secures the seal element 52 within the seal carrier receptacle 146 such that the seal element 52 is fixedly mounted to the seal carrier 132. Of course, the seal element 52 may also or alternatively be mounted to the seal carrier 132 using other fastening and/or bonding techniques. The seal element passage 100 is fluidly coupled with and between the seal carrier passage 148 and the seal land passage 74/the bearing compartment 30. For example, a fluid interface is formed between the passage 148 slot and the passage 100 apertures and a fluid interface is formed between the passage 100 apertures and the passage 74 groove and/or the compartment 30 via a leakage path between the components 50 and 52.

The coupling device tube 166 is seated in the receptacle 160. More particularly, the coupling device tube 166 projects radially, relative to the axial centerline 42, into the receptacle 160 to its distal end 184. The elements 166 and 132 may be configured such that there is a relatively tight fit between those elements 166 and 132 in order to form a seal interface therebetween. An annular ring seal element 200 may also or alternatively be arranged between the coupling device tube 166 and the seal carrier 132.

The fluid coupling device 134 is mated with/slidably mounted on a respective one of the guide rails 54—the guide rail 54 with the guide rail passage 120. In particular, the guide rail 54 is inserted through the bore of the coupling device sleeve 164 such that the bore surface 180 engages the cylindrical surface 117 of the guide rail 54. The surfaces 117 and 180 may be configured (e.g., sized) such that there is a relatively tight fit between the elements 54 And 164 in order to form a seal interface therebetween. The coupling device passage 186 is fluidly coupled with the guide rail passage 120. More particularly, a fluid interface is formed between the passage 120 aperture and the passage 186 slot.

The seal carrier 132 is mated with the guide rails 54. In particular, each of the guide rails 54 projects through a respective flange aperture 162; see also FIG. 6. In this manner, the seal support structure 56 translatably, but non-rotatably, couples the seal element 52 with the static structure 22.

One or more spring elements 202 (e.g., coil springs) may be arranged between the static structure 22 and the seal carrier 132. These spring elements 202 are configured to bias the seal carrier 132 and, thus, the seal element 52 away from the static structure 22 and towards the seal land 50. In particular, the spring elements 202 cause the surfaces 66 and 92 to axially abut and sealingly engage (e.g., contact) one another.

During operation of the assembly 20 of FIG. 1, fluid (e.g., lubricant and/or coolant) flows through the fluid passages 36, 120, 186, 148 and 100. In particular, the fluid flows sequentially through the fluid passages 36, 120, 186, 148 and 100 and is discharged into the bearing compartment 30 for collection in a bearing compartment sump. Heat energy may be transferred from the seal element 52 into the fluid as the fluid travels through the seal element passage 100. The flow of the fluid through the seal element 52 may thereby cool the seal element 52 during operation and, thus, mitigate heat related stresses and degradation of the seal element 52 caused by rubbing friction between the elements 50 and 52. Furthermore, the seal element passage outlet 94 provides the fluid to an interface between the surfaces 66 and 92 such that the fluid may at least partially wet those surfaces 66 and 92 at the interface and thereby form a (e.g., quasi) wet-faced seal. Where the fluid leaks radially inward from the seal element passage outlet 94, the groove 68 may catch this leakage fluid and the seal land passage 74 may route the leakage fluid back into the bearing compartment 30. Of course, in other embodiments, the seal land 50 may be configured without the seal land passage 74 where the fluid leakage is, for example, captured in a different manner.

In order to accommodate engine vibrations and differential thermal expansion between the components, the seal carrier 132 and the fluid coupling device 134 are each adapted to move (e.g., translate) axially along the guide rail(s) 54. In addition, the fluid coupling device 134 may also move (e.g., radially) relative to the seal carrier 132 to accommodate radial movements/shifting of the seal carrier 132 relative to the guide rails 54.

Figure 11:
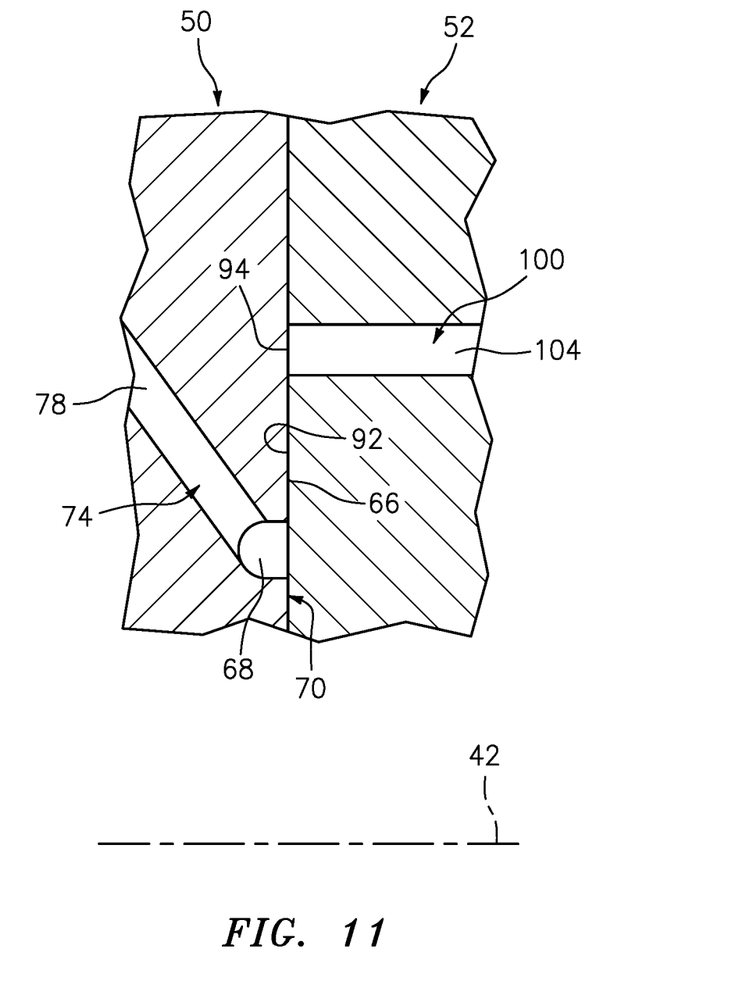
FIG. 11 is a partial side sectional illustration of an interface between the seal land and the seal element.

The seal element passage outlet 94 of FIG. 11 is (e.g., radially and circumferentially) overlapped by the seal land surface 66. In this specific embodiment of FIG. 11, the seal land surface portion 70 overlaps the seal element passage outlet 94. With this arrangement, the seal land passage groove 68 is radially displaced from (e.g., radially inward of) the seal element passage outlet 94. The present disclosure, however, is not limited to such an exemplary embodiment.

The assembly 20 is described above as including a single fluid coupling device 134 for ease of description. However, in other embodiments, the assembly 20 may include one or more additional fluid coupling devices 134 such that a plurality or all of the guide rails 54 is associated with a respective fluid coupling device 134. The number of fluid coupling devices 134 included may be selected based on the cooling requirements of the seal element 52. In such embodiments, the seal carrier passage 148 includes a plurality of the second apertures 154; e.g., see dashed aperture in FIG. 9.

In some embodiments, the assembly 20 may also include one or more secondary seals. For example, the assembly 20 of FIG. 1 includes an annular secondary seal element 204 axially between the seal element 52 and the seal carrier 132. This secondary seal element 204 is configured to separate cooling fluids from boundary fluids.

Figure 12:
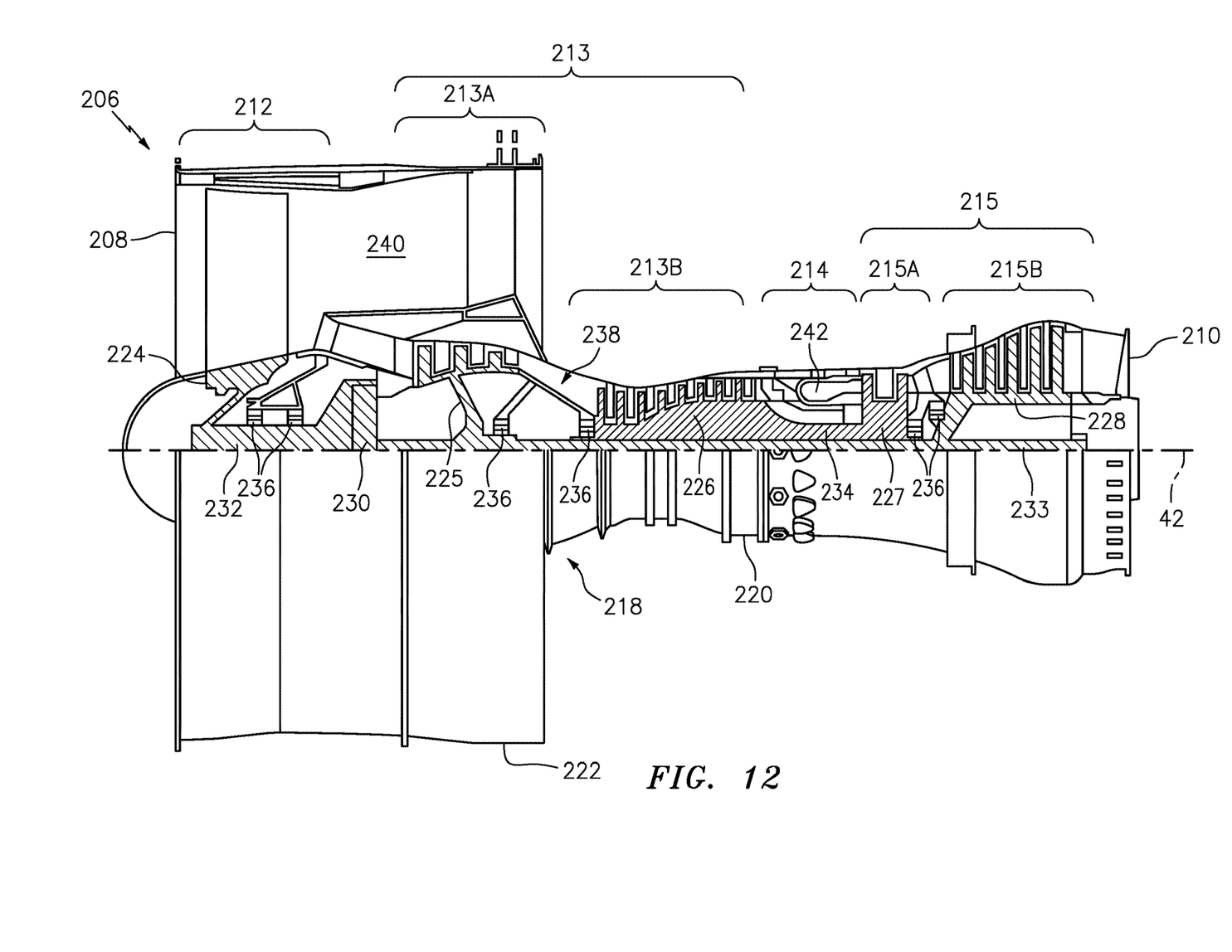
FIG. 12 is a side cutaway illustration of a geared turbine engine with which the assembly of FIG. 1 may be configured.

FIG. 12 is a side cutaway illustration of a geared turbine engine 206 with which the assembly 20 of FIG. 1 may be configured. The turbine engine 206 extends along an axial centerline (e.g., the centerline 42) between an upstream airflow inlet 208 and a downstream airflow exhaust 210. The turbine engine 206 includes a fan section 212, a compressor section 213, a combustor section 214 and a turbine section 215. The compressor section 213 includes a low pressure compressor (LPC) section 213A and a high pressure compressor (HPC) section 213B. The turbine section 215 includes a high pressure turbine (HPT) section 215A and a low pressure turbine (LPT) section 215B.

The engine sections 212-215B are arranged sequentially along the axial centerline 42 within an engine housing 218. This engine housing 218 includes an inner case 220 (e.g., a core case) and an outer case 222 (e.g., a fan case). The inner case 220 may house one or more of the engine sections 213A-215B; e.g., an engine core. This inner case 220 may include or may be connected to the static structure 22 of FIG. 1. The outer case 222 may house at least the fan section 212.

Each of the engine sections 212, 213A, 213B, 215A and 215B includes a respective rotor 224-228. Each of these rotors 224-228 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 224 is connected to a gear train 230, for example, through a fan shaft 232. The gear train 230 and the LPC rotor 225 are connected to and driven by the LPT rotor 228 through a low speed shaft 233. The HPC rotor 226 is connected to and driven by the HPT rotor 227 through a high speed shaft 234. The shafts 232-234 are rotatably supported by a plurality of bearings 236; e.g., rolling element and/or thrust bearings. Each of these bearings 236 is connected to the engine housing 218 by at least one stationary structure such as, for example, an annular support strut. The rotating structure 40 of FIG. 1 may be configured as any one of the shafts 232-234 or a component mounted thereto or otherwise rotatable therewith, and the bearing 26 of FIG. 1 may be configured as any one of the bearings 236.

During operation, air enters the turbine engine 206 through the airflow inlet 208. This air is directed through the fan section 212 and into a core gas path 238 and a bypass gas path 240. The core gas path 238 extends sequentially through the engine sections 213A-215B. The air within the core gas path 238 may be referred to as "core air". The bypass gas path 240 extends through a bypass duct, which bypasses the engine core. The air within the bypass gas path 240 may be referred to as "bypass air".

The core air is compressed by the compressor rotors 225 and 226 and directed into a combustion chamber 242 of a combustor in the combustor section 214. Fuel is injected into the combustion chamber 242 and mixed with the compressed core air to provide a fuel-air mixture. This fuel air mixture is ignited and combustion products thereof flow through and sequentially cause the turbine rotors 227 and 228 to rotate. The rotation of the turbine rotors 227 and 228 respectively drive rotation of the compressor rotors 226 and 225 and, thus, compression of the air received from a core airflow inlet. The rotation of the turbine rotor 228 also drives rotation of the fan rotor 224, which propels bypass air through and out of the bypass gas path 240. The propulsion of the bypass air may account for a majority of thrust generated by the turbine engine 206, e.g., more than seventy-five percent (75%) of engine thrust. The turbine engine 206 of the present disclosure, however, is not limited to the foregoing exemplary thrust ratio.

The assembly 20 may be included in various turbine engines other than the one described above as well as in other types of rotational equipment. The assembly 20, for example, may be included in a geared turbine engine where a gear train connects one or more shafts to one or more rotors in a fan section, a compressor section and/or any other engine section. Alternatively, the assembly 20 may be included in a turbine engine configured without a gear train. The assembly 20 may be included in a geared or non-geared turbine engine configured with a single spool, with two spools (e.g., see FIG. 12), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for rotational equipment, comprising:
a seal land extending circumferentially around and rotatable about an axial centerline, the seal land comprising a seal land surface; and
a seal element extending circumferentially around the axial centerline, the seal element comprising a seal element surface and a seal element passage, the seal element surface abutted against and sealingly engaged with the seal land surface, and the seal element passage extending through the seal element to an interface between the seal element surface and the seal land surface;
the seal element passage extending axially within the seal element to an outlet in the seal element surface; and
the seal land further comprising a groove and an aperture, the groove arranged in the seal land surface radially displaced from the outlet, and the aperture fluidly coupled with the groove and extending through the seal land.

2. The assembly of claim 1, wherein
the seal element further comprises a second seal element passage; and
the second seal element passage extends through the seal element to the interface between the seal element surface and the seal land surface.

3. The assembly of claim 1, wherein the seal element comprises an annular carbon seal element.

4. The assembly of claim 1, wherein
the seal element extends axially along the axial centerline between a seal element first end and a second element second end; and
the seal element surface is arranged at the seal element first end.

5. The assembly of claim 1, further comprising:
a static structure of a gas turbine engine, the seal element non-rotatably coupled to the static structure; and
a rotating structure of the gas turbine engine, the seal land rotatable with the rotating structure;
wherein the rotational equipment comprises the gas turbine engine.

6. The assembly of claim 1, further comprising:
a guide rail; and
a seal carrier mated with and translatable along the guide rail;
the seal element mounted to the seal carrier.

7. An assembly for rotational equipment, comprising:
a seal land extending circumferentially around and rotatable about an axial centerline, the seal land comprising a seal land surface;
a seal element extending circumferentially around the axial centerline, the seal element comprising a seal element surface and a seal element passage, the seal element surface abutted against and sealingly engaged with the seal land surface, and the seal element passage extending through the seal element to an interface between the seal element surface and the seal land surface;
a guide rail configured with a guide rail passage; and
a seal support structure mated with and translatable along the guide rail;
the seal element mounted to the seal support structure; and
the seal element passage fluidly coupled with the guide rail passage through the seal support structure.

8. The assembly of claim 7, further comprising a spring element configured to bias the seal element against the seal land.

9. The assembly of claim 7, further comprising:
a plurality of guide rails comprising the guide rail, the plurality of guide rails arranged in an array about the axial centerline; and
the seal support structure mated with and slidable along each of the plurality of guide rails.

10. The assembly of claim 7, wherein
the seal support structure comprises a seal carrier and a fluid coupling device;
the seal carrier is mated with and slidable along the guide rail, and the seal carrier is configured with a carrier passage that is fluidly coupled with the seal element passage; and
the fluid coupling device is mounted to and translatable along the guide rail, and the fluid coupling device is configured with a coupling device passage that fluidly couples the guide rail passage with the carrier passage.

11. The assembly of claim 10, wherein the fluid coupling device is configured to move relative to the seal carrier.

12. The assembly of claim 10, wherein
the fluid coupling device includes a sleeve and a tube;
the sleeve is mounted to and translatable along the guide rail; and
the tube projects out from the sleeve and into a receptacle of the seal carrier.

13. The assembly of claim 10, wherein the carrier passage includes an annular slot that interfaces with an inlet of the seal element passage.

14. The assembly of claim 10, wherein
the seal carrier includes a flange; and
the guide rail projects through a channel that extends radially into the flange.

15. The assembly of claim 7, wherein
the seal element passage extends within the seal element to an outlet in the seal element surface; and
the seal land surface overlaps the outlet.

16. The assembly of claim 7, further comprising:
a static structure of a gas turbine engine, the seal element non-rotatably coupled to the static structure; and
a rotating structure of the gas turbine engine, the seal land rotatable with the rotating structure;
wherein the rotational equipment comprises the gas turbine engine.

17. An assembly for rotational equipment, comprising:
a guide rail comprising a guide rail passage;
a seal carrier mated with and translatable along the guide rail; and
a seal element mounted to the seal carrier, the seal element comprising a seal element surface and a seal element passage that extends through the seal element to the seal element surface, wherein the seal element passage is fluidly coupled with the guide rail passage.

* * * * *